United States Patent [19]
Hamilton et al.

[11] Patent Number: 5,758,186
[45] Date of Patent: May 26, 1998

[54] METHOD AND APPARATUS FOR GENERICALLY HANDLING DIVERSE PROTOCOL METHOD CALLS IN A CLIENT/SERVER COMPUTER SYSTEM

[75] Inventors: Graham Hamilton; Peter B. Kessler, both of Palo Alto; Jeffrey D. Nisewanger, San Jose; Alan Bishop; Eduardo Pelegri-Llopart, both of Mountain View, all of Calif.

[73] Assignee: Sun Microsystems, Inc., Mountain View, Calif.

[21] Appl. No.: 539,999

[22] Filed: Oct. 6, 1995

[51] Int. Cl.$^6$ ............................................. G06F 13/00
[52] U.S. Cl. ...................................... 395/831; 395/200.33
[58] Field of Search ............................. 370/94.1; 379/67, 379/200, 671, 700, 114

[56] References Cited

U.S. PATENT DOCUMENTS

| | | | |
|---|---|---|---|
| 5,260,990 | 11/1993 | MeLampy et al. | 379/67 |
| 5,303,336 | 4/1994 | Kageyama et al. | 395/114 |
| 5,329,619 | 7/1994 | Page et al. | 395/200 |
| 5,485,460 | 1/1996 | Schrier et al. | 370/94.1 |
| 5,522,079 | 5/1996 | Acker et al. | 395/700 |
| 5,546,584 | 8/1996 | Lundin et al. | 395/700 |
| 5,577,251 | 11/1996 | Hamilton et al. | 395/671 |
| 5,638,497 | 6/1997 | Kimber et al. | 395/114 |

OTHER PUBLICATIONS

"The Java Language Specification", Release 1.0 Alph3, May 11, 1995, Sun Microsystem Computer Corporation.

"Java and Internet Programming", Dr. Dobb's Journal, Aug. 1995, pp. 55–61 and 101–102.

"The Coming Software Shift Telecom", by George Gilder, Aug. 28, 1995, pp. 147–162.

"The Internet becomes multimedia-savvy: Macromedia, Sun nabe Netscape Navigator", by Jason Snell, MacUser, Sep. 1995, vol. 11, No. 9, p. 31(1).

(List continued on next page.)

*Primary Examiner*—Thomas C. Lee
*Assistant Examiner*—David Ton
*Attorney, Agent, or Firm*—Flehr Hohbach Test Albritton & Herbert LLP; William S. Galliani; Clare T. Hartnett

[57] ABSTRACT

A client/server computer apparatus includes a large number of client computers connected to a transmission channel. The client computers generate method calls that are applied to the transmission channel. Each method call may be encoded with a different communication protocol. A server computer processes each method call from the transmission channel by initially locating within each method call a method descriptor specified in a protocol-dependent format. The method descriptor is then compared to a list of protocol-dependent values stored in the memory of the server computer. An index value is assigned upon matching the method descriptor to a selected protocol-dependent value in the list of protocol-dependent values. The index value is passed to a protocol-independent portion of the server computer. The protocol-independent portion of the server computer executes the method corresponding to the index value to generate a reply. The reply is then transported over the transmission channel to the client computer.

17 Claims, 5 Drawing Sheets

OTHER PUBLICATIONS

"OSF Opens Software Web Mall For Java", Newsbytes, Jul. 26, 1995.

"Complex Browsers Seek to Expand Role", (World Wide Web browsers), by Scott R. Raynovich, LAN Times, Jul. 3, 1995, vol. 12, No. 13, p. 1(2).

"Sun, Netscape to wake up Web users", (Sun Microsystems license its Java World Wide Web development language to Netscape Communications Corp), Scott R. Raynovich, LAN Times, Jun. 19, 1995, vol. 12, No. 12, p. 44(1).

"Internet access: Sun unveils most complete set of Internet business solution available today; Internet pioneer delivers on challenge of electronic commerce", EDGE: Work–Group Computing Report, May 29, 1995, vol. 6, No. 262.

"Sun takes new shape" (Sun Microsystems strategy for its UltraSPARC microprocessor), by Jim DeTar, Electronic News (1991), May 29, 1995, vol. 41 No. 2067, p. 1(2).

"HotJava could become a lot hotter than just a Web browser for animations" (Sun Microsystems HotJava Web browser) (Distributed Thinking), by Stewart Alsop, InfoWorld, May 29, 1995, vol. 17, No. 22, p. 94(1).

"Sun Microsystems Bringing Interactive Technology to the WWW", by Michael Goulde, Open Information Systems, Mar. 1995, vol. 10, No. 3, p. 29(3).

"Hi–resolution" (New Year's resolutions), by Gil Schwartz, PC–Computing, Jan. 1995, vol. 8, No. 1, p. 77(1).

"The Common Object Request Broker: Architecture and Specification", (COBRA V2.0) Revision 2.0, Jul. 1995.

"A Spring Collection", (A Collection of Papers on the Spring Distributed Object–Oriented Operating System), SunSoft, Sep. 1994.

"The Java Language Environment", by James Gosling and Henry McGilton, May 1995, pp. i–65.

METHOD AND APPARATUS FOR GENERICALLY HANDLING DIVERSE PROTOCOL METHOD CALLS IN A CLIENT/SERVER COMPUTER SYSTEM

BRIEF DESCRIPTION OF THE INVENTION

This invention relates generally to client/server computer networks. More particularly, this invention relates to a server computer that can generically handle method calls from object request brokers that use various communication protocols.

BACKGROUND OF THE INVENTION

In a client/server computer network, the user of a client computer requests the execution of an object. In particular, the user requests the execution of a method associated with the object. Frequently, the object is not stored locally on the client computer. Thus, a remote procedure call (RPC) must be made to a server computer on which the object resides. The RPC specifies the object and its associated method. The server computer identifies the method to be executed, executes that method, and passes the results and/or exceptions generated back to the client computer. The distributed mechanism for handling remote procedure calls is often referred to as an Object Request Broker (ORB). The mechanism is distributed in the sense that the software associated with an ORB is on both the client computer and the server computer.

There are a large number of "on-the-wire" data formats that a client computer may use to transmit a remote procedure call to a server computer. The same on-the-wire data formats are also used to transmit results back from the server computer to the client computer. More generally, these on-the-wire data formats define the format of all messages associated with remote procedure calls.

The on-the-wire data formats, generically referred to herein as protocols, establish such factors as how arguments are passed and how data types are handled. Different vendors implement ORBs with different protocols. Recently, an industry standard called the Universal Networked Objects (UNO) protocol was promulgated by the Object Management Group. This protocol is primarily viewed as a gateway protocol for connecting object systems from different vendors. At least in the short term, different vendors appear likely to continue to use their existing protocols for higher performance within their own object systems, while supporting lower performance UNO gateways on their ORBs. Thus, RPC related messages will continue to be transported using a variety of protocols. Consequently, it would be highly desirable to provide a server computer that easily and expeditiously recognizes any number of protocols used in RPC related messages.

SUMMARY OF THE INVENTION

An embodiment of the invention is a distributed client/server computer system with a large number of client computers connected to a transmission channel. The client computers generate method calls (also called remote procedure calls) that are applied to the transmission channel. Each method call may be encoded with a different communication protocol. A server computer processes each method call received via the transmission channel by initially locating within the method call a method descriptor specified in a protocol-dependent format. The method descriptor is then compared to a list of protocol-dependent values stored in the memory of the server computer. An index value is assigned upon matching the method descriptor to a selected protocol-dependent value in the list of protocol-dependent values. The index value is passed to a protocol-independent portion of the server computer. The protocol-independent portion of the server then executes the method corresponding to the index value to generate a reply. The reply is then transported over the transmission channel to the client computer.

Another embodiment of the invention includes the step of receiving at a server computer a method call generated by a client computer. Thereafter, a method description specified in a protocol-dependent format is located within the method call. An index value is then assigned upon matching the method descriptor to a selected protocol-dependent value in a list of protocol-dependent values. Then, the index value is passed to a protocol-independent processing module of the server. Next, the server executes the method corresponding to the index value and the results of that method execution are then transported over the transmission channel to the client computer.

The protocol-independent portion of the server constitutes a single set of object specific code that may be used to process all method calls, regardless of the protocol used by the client computer to send the method call to the server. Consequently, different sets of object specific computer code are not required for processing the different protocols used on the transmission channel. The present invention thereby facilitates the processing of remote procedure calls to methods in objects in a language and vendor independent manner. As a result, network servers can be transparently accessed from different client environments. Thus, for example, network servers on the Internet can process the requests of client computers, and client computers can access network servers, in a manner that was previously not available.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
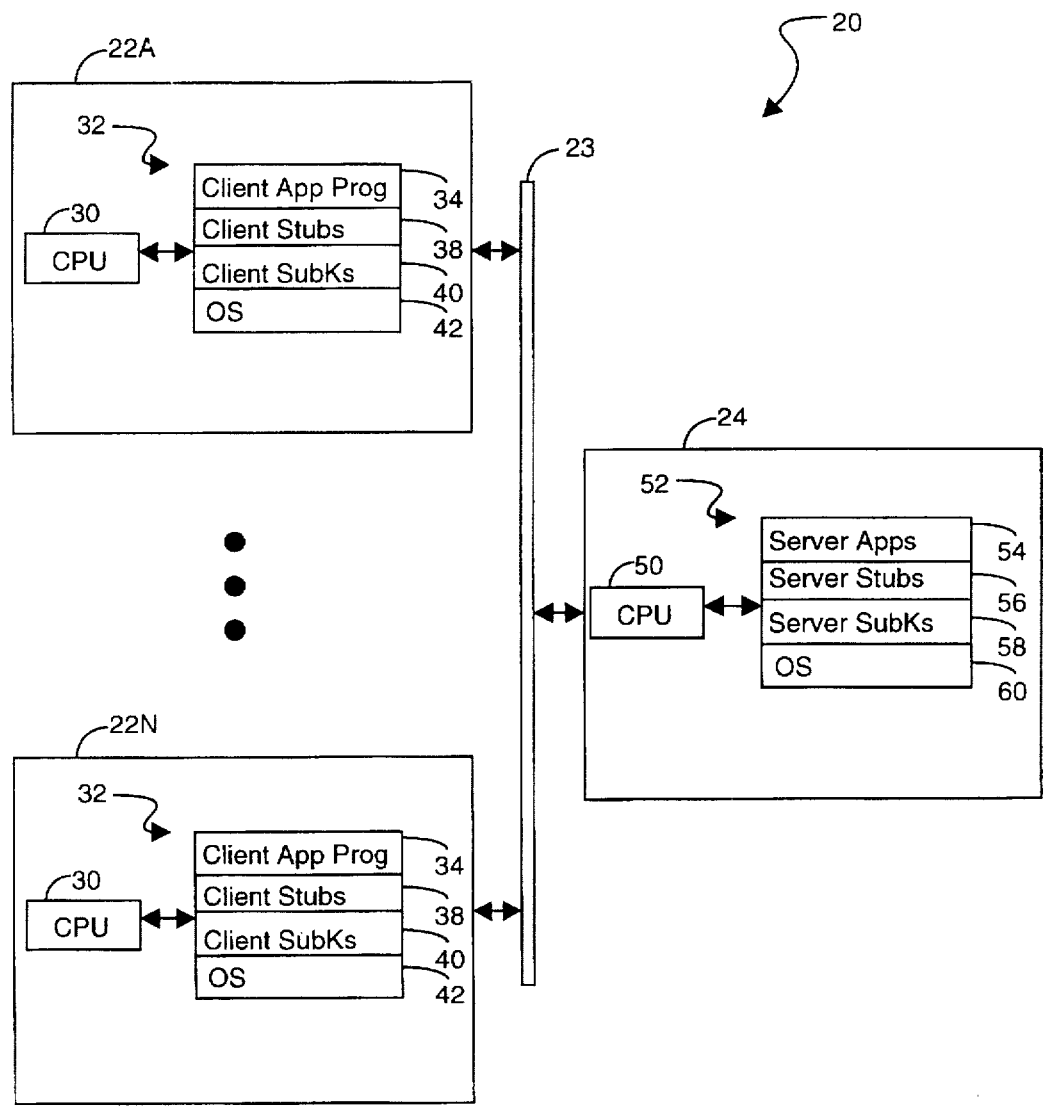
FIG. 1 illustrates a client/server computer topology.

FIG. 1 illustrates a client/server computer apparatus 20 incorporating the technology of the present invention. The apparatus 20 includes a set of client computers 22A–22N, which are each linked to a transmission channel 23. The transmission channel 23 generically refers to any wire or wireless link between computers. The client computers 22A–22N use the transmission channel 23 to communicate with a server computer 24.

Each client computer 22 has a standard computer configuration including a central processing unit (CPU) 30 connected to a memory 32, which stores a set of executable programs. The executable programs in this exemplary system include at least one client application program 34, client stubs 38, client subcontracts 40, and an operating system 42.

The client application program 34 is any application-level program, such as an application program that the user of a client computer 22 interacts with. The client stubs 38 receive procedure calls by the application program 34 requesting the execution of specified methods of specified objects. The purpose of the client stubs 38 is to access objects that are implemented in other address spaces, such as at server computer 24.

The client subcontract programs 40 and server subcontract programs 58 control the basic mechanisms of object invocation and argument passing. They control how object invocation is implemented, how object references are transmitted between address spaces, how object references are released, and similar object runtime operations. For example, when a client invokes an object of a given subcontract, the subcontract implements the object invocation by transmitting the request to the address space where the associated object is located, commonly the server computer 24.

The client subcontract programs 40 perform a marshal operation to transmit an object invocation (i.e., a remote procedure call) to another address space. A corresponding unmarshalling operation is performed by a server subcontract 58 on the server computer 24. The client subcontract programs 40 also perform unmarshal operations when receiving a reply (such as the results generated from a method call) from another computer, say the server computer 24. An operating system 42, such as the Sun Microsystem's SOLARIS operating system, underlies the operations of the client application programs 34, the client stubs 38, and the client subcontracts 40.

The server 24 has a configuration analogous to that of the client computers 22. The server 24 includes a CPU 50 and an associated memory 52. The memory 52 stores server application programs 54, server stubs 56, server subcontract programs 58, and an operating system 60. As indicated above, the server stubs 56 handle incoming method invocations on an object and call the specified method to perform the operation. As also indicated above, the server subcontracts 58 perform data marshalling and other operations to support the transport of method invocations and the resulting return messages between the server 24 and the client computers 22.

Figure 2:
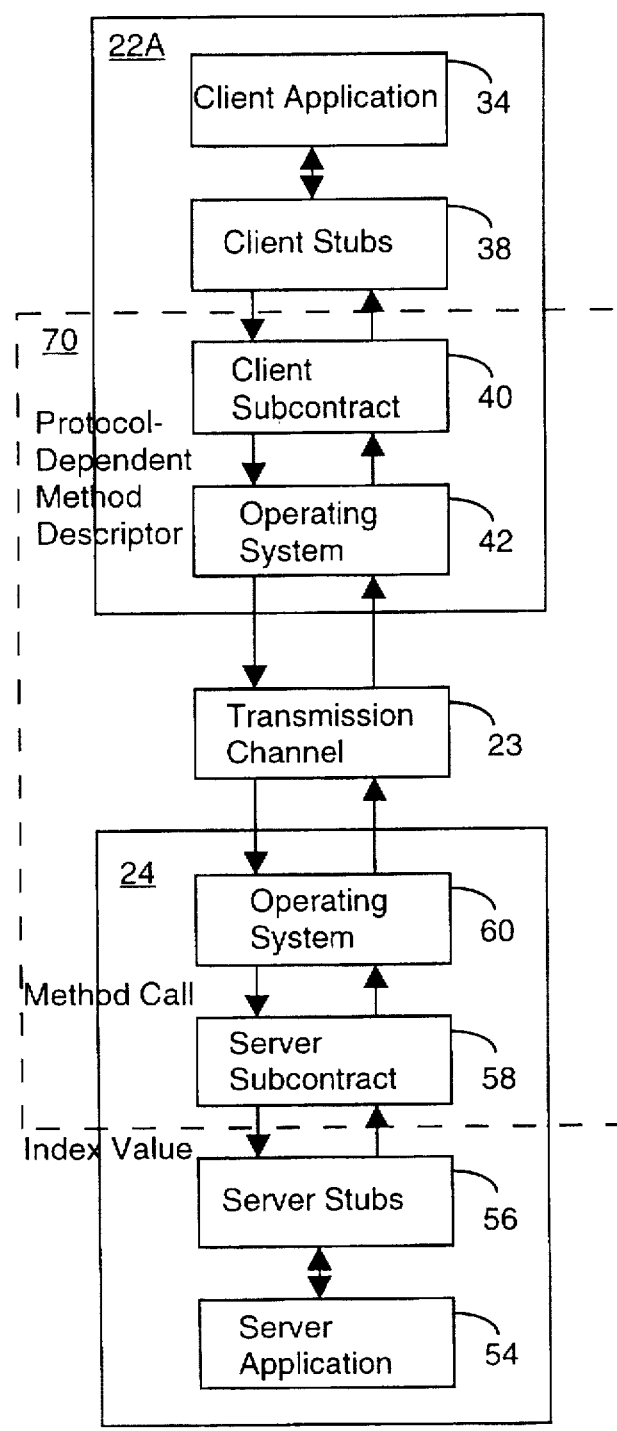
FIG. 2 illustrates the processing associated with the apparatus of FIG. 1.

The operations of the apparatus of FIG. 1 are more fully appreciated with reference to FIG. 2. FIG. 2 illustrates the client computer 22A, the transmission channel 23, and the server 24 of FIG. 1. As indicated above, a client application 34 invokes a specified method of an object in a different address space using a remote procedure call. The remote procedure call is passed by the client stubs 38 to the client subcontract 40, which packages the remote procedure call for transport on the transmission channel 23. The server subcontract 58 of the server 24 receives the information and unpackages it. The server subcontract 58 then passes the information to the server stubs 56. The server stubs 56 access the server application programs 54, which are the previously described object methods. More specifically, a specified server stub 56 makes a procedure call to execute a specified method of the invoked object. The execution of the method produces a set of results, herein called a reply, which is then passed back to the server subcontract 58 and the communication path is reversed, as indicated by the arrows of FIG. 2.

Block 70 of FIG. 2 illustrates the components associated with an Object Request Broker (ORB) of the invention. As indicated above, a wide variety of communication protocols are used on ORBs. The use of different protocols on different ORBs results in difficulties when a server attempts to recognize incoming object requests.

The general architecture and processing associated with the invention has now been disclosed. Attention presently turns to a more detailed consideration of the architecture of the invention, the processing of the invention, the distinctions between these elements and corresponding elements in the prior art, and the advantages associated with the disclosed technology.

As shown in FIG. 2, a client subcontract 40 uses a protocol-dependent method descriptor to request a method associated with an invoked object. More particularly, the client subcontract 40 uses a marshal buffer that obeys a selected on-the-wire data format. For example, to identify a given method "X", one protocol might use a value of "XXX", another might use a value of "@@@::123::XXX", and another might use an integer value "123456", where the value is the output of a hash function on the method name. The client stub 38 passes to the client subcontract 40 a list of protocol-dependent values from which the client subcontract 40 computes the protocol-dependent method descriptor.

Thus, when a set of client computers 22A–22N are connected to a server 24, the server 24 must process each protocol. Separate server subcontracts 58 (not shown) are necessary to accommodate each of these protocols. In the prior art, each server subcontract 58 has a set of corresponding server stubs 56. Thus, to support ORBs with multiple protocols, a server 24 should have different server stubs 56 for each protocol, resulting in a large set of server stubs 56. Consequently, it can be readily appreciated that the use of different ORB protocols can result in unwieldy requirements for the server 24.

In accordance with the present invention, when the server subcontract 58 receives an incoming method call it unmarshals the method descriptor in a way that is specific to the subcontract's protocol. It then tries to match the method descriptor with each of the entries in a list of protocol-dependent values. Protocol-dependent values can be character strings, numeric values, as well as other types of parameter values. Different protocols may use different matching functions to compare the method descriptor with the list of protocol-dependent values. The matching function may by a string comparison, a hashing function, or other technique specified by the server subcontract 58. When a matching protocol-dependent value is identified, the server subcontract 58 can then associate it with an index value.

As shown in FIG. 2, the index value is passed to protocol-independent server stubs 56 that can invoke the method corresponding to the index value. In this way, the protocol dependencies of the individual object references are insulated from the protocol-independent server stubs 56. Consequently, protocol-independent server stubs 56 can be used with any type of object request broker 70. Furthermore, a single compiler may be used to generate the protocol-independent server stubs 56.

Thus, unlike the prior art, the present invention provides a server 24 that recognizes a variety of ORB protocols. Moreover, it performs this function in a highly effective manner by using a single set of protocol-independent server stubs 56.

Note that to support this technique, the marshalling and unmarshalling operations commonly employed by prior art stubs are performed by the client subcontract 40 and server subcontract 58 of the invention. This transfer of processing and the use of an index value to provide protocol-independent server stubs constitute processing differences between the prior art and the present invention. Thus, the present invention can be successfully implemented in existing architectures and processes, once these processing differences are accommodated.

Figure 3:
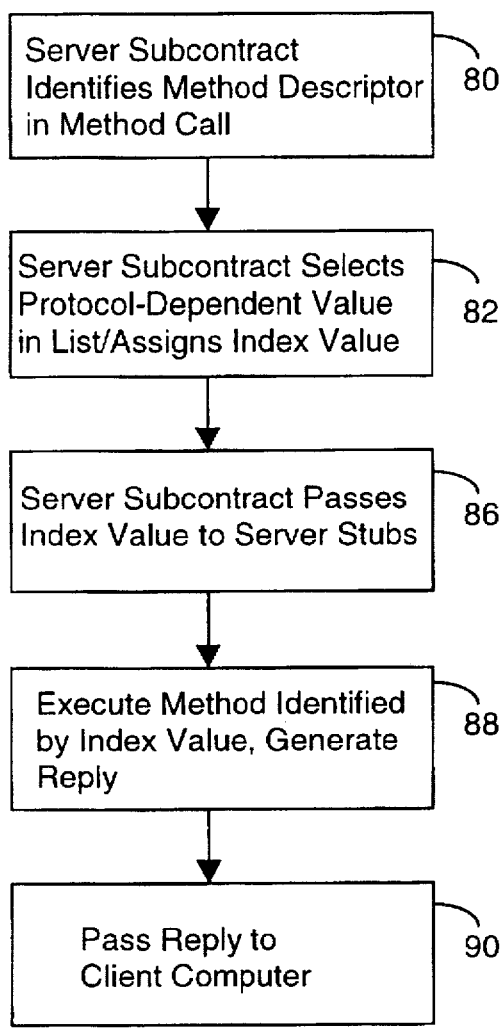
FIG. 3 illustrates the processing steps associated with an embodiment of the protocol recognition methodology of the invention.

FIG. 3 provides a detailed illustration of the processing steps described in the foregoing paragraphs. The first processing step of FIG. 3 is that the server subcontract identifies a method descriptor in a method call (block 80). As indicated above, the client computer produces a method call, which is ultimately packaged in a marshal buffer as a set of information. The content of the information is contingent upon the client subcontract that has marshalled the information. The corresponding subcontract at the server unmarshals the information and recognizes, within the information, the method descriptor.

Figure 4:
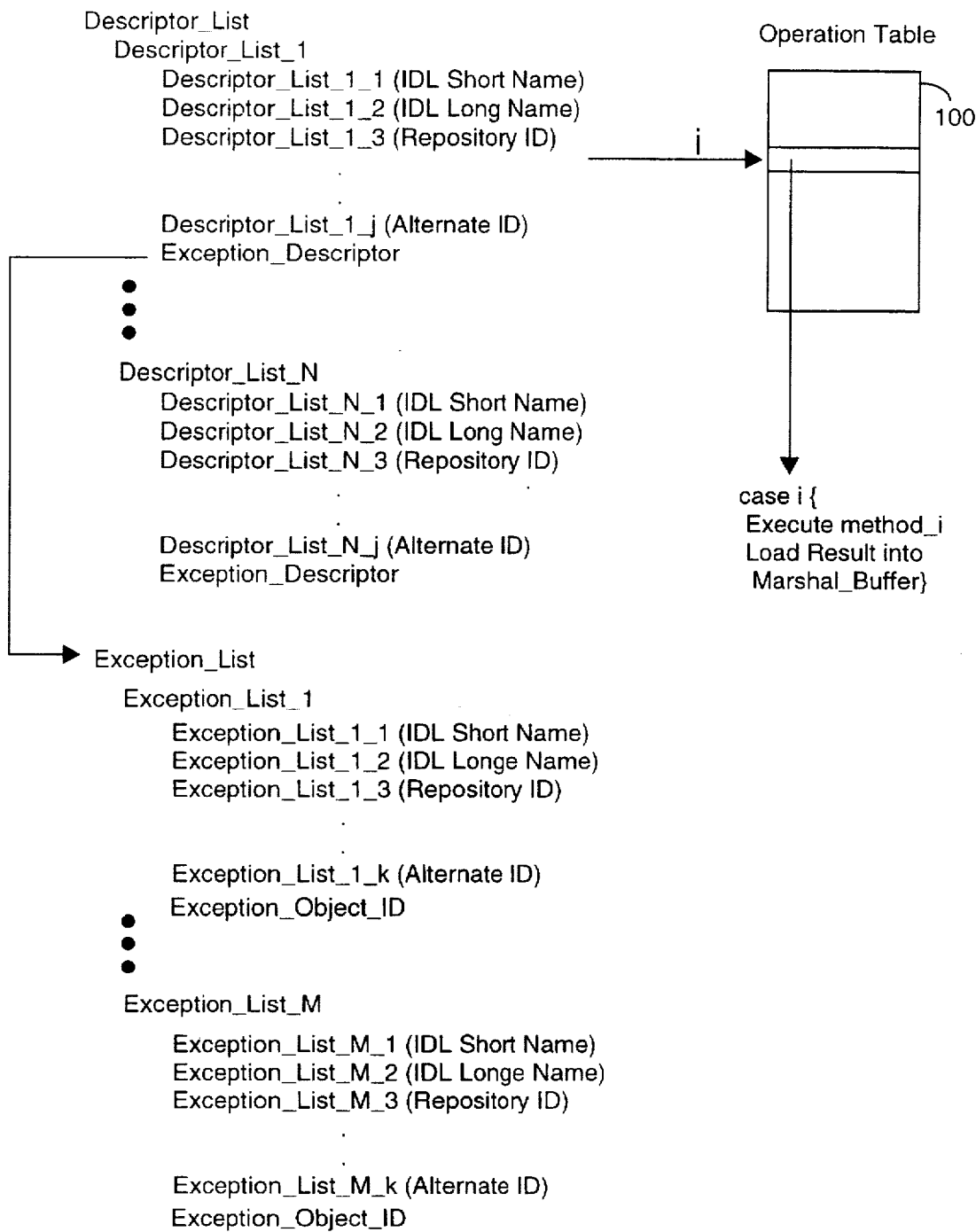
FIG. 4 illustrates an example of a data structure that may be used in practicing the disclosed technology.

The next processing step is for the server subcontract to select a protocol-dependent value that matches the method descriptor (block 82). This operation may be illustrated with reference to FIG. 4. FIG. 4 shows a Descriptor_List of protocol-dependent values. This list includes N subset lists. Each subset list identifies a set of protocol-dependent values that may be used to identify a single method. Each subset list has j entries. In FIG. 4, these entries are shown as Descriptor_List_1_1 through Descriptor_List_1_j. In FIG. 4, Descriptor_List_1_1 is associated with an Interface Definition Language (IDL) Short Name. IDL is an industry standard. That is, one entry in the list is the IDL short name for the invoked method. The IDL Short Name is an ORB protocol name used in the art. The same list shows that Descriptor_List_1_2 is associated with an IDL Long Name. That is, this entry in the list is the IDL long name for the invoked method. The IDL Long Name is another ORB protocol name used in the art. The third entry in the subset list is Descriptor_List_1_3, which has a repository ID. The repository ID is a name used in another ORB protocol in the art. Examples of these different protocols include the following statements:

```
"get_weak_comparator" (IDL Short Name),
"::comparator::weak_comparable::get_weak_comparator"
    (IDL Long Name), and
"IDL:/comparator/weak_comparable/get_weak_comparator:1.0"
    (Repository ID),
``` which are used to invoke the operation get_weak_comparator.

As indicated in FIG. 4, alternate designations may also be used in the list of protocol-dependent values. In addition, the designations shown by example herein need not be used. In any event, using the format established by the IDL standard and other industry standards and practices, it is possible to predict the manner in which most method descriptors will be implemented by any reasonable protocol.

The following pseudo code is used as a simple example to illustrate how the descriptor list may be searched.

```
(1) i = 0
(2) match = false
(3) repeat
    (4) i = i + 1
    (5) if Match_p (Method_Descriptor, Descriptor_List_i_j)
```

-continued

```
    (6) Then Match = True
(7) until Match
(8) call operation_Table(i)
```

Lines (1) and (2) provide initialization. Line (3) is the entry into a processing loop. Line (4) provides initialization within the processing loop. Line (5) tests for a condition. Namely, the code tests if the unmarshalled "Method_Descriptor" of the method call matches the "jth" entry of the "ith" subset list (Descriptor_List_i_j) of the protocol-dependent list. The "jth" entry, say the IDL short name, is known from the server subcontract 58 to be the one to compare for this protocol. The "ith" value is an incremented value that allows each subset descriptor list (Descriptor_List_1 through Descriptor_List_N) to be tested. The term "Match_p" refers to the matching function that is used to compare the Method_Descriptor to the list entry. For instance, "Match_p" might specify a simple string comparison between values, or it might specify the comparison of hash values. The definition of "Match_p" is provided by the server subcontract 58.

If the condition is met, then a match is found, otherwise, the next subset list "i" is accessed. When a match is found, then line (8) provides a call to an operation table of the server stubs (56). Note that the value "i" when a match is found is the value passed to the server stubs. This value corresponds to a subset of the searched list, and this subset is associated with a single method that has been called. Thus, the code at line (8) illustrates the next processing step of FIG. 3, namely that the server subcontract passes an index value to the server stubs (block 86).

Once the server stubs receive the index value, they rely upon an operation table 100, shown in FIG. 4, to invoke the method specified by the index value. The operation table is preferably implemented as a case table that has a set of processing steps associated with each case value "i". When the value "i" is received, the method specified by the value is executed (block 88). FIG. 4 illustrates a simple set of processing steps to achieve this result. The first step is to execute method i, and the second step is to load all resulting messages (the reply) into the marshal buffer. The final processing step shown in FIG. 3 is for the server stubs to pass the reply generated from the execution of the method to the server subcontracts (block 90).

Figure 5:
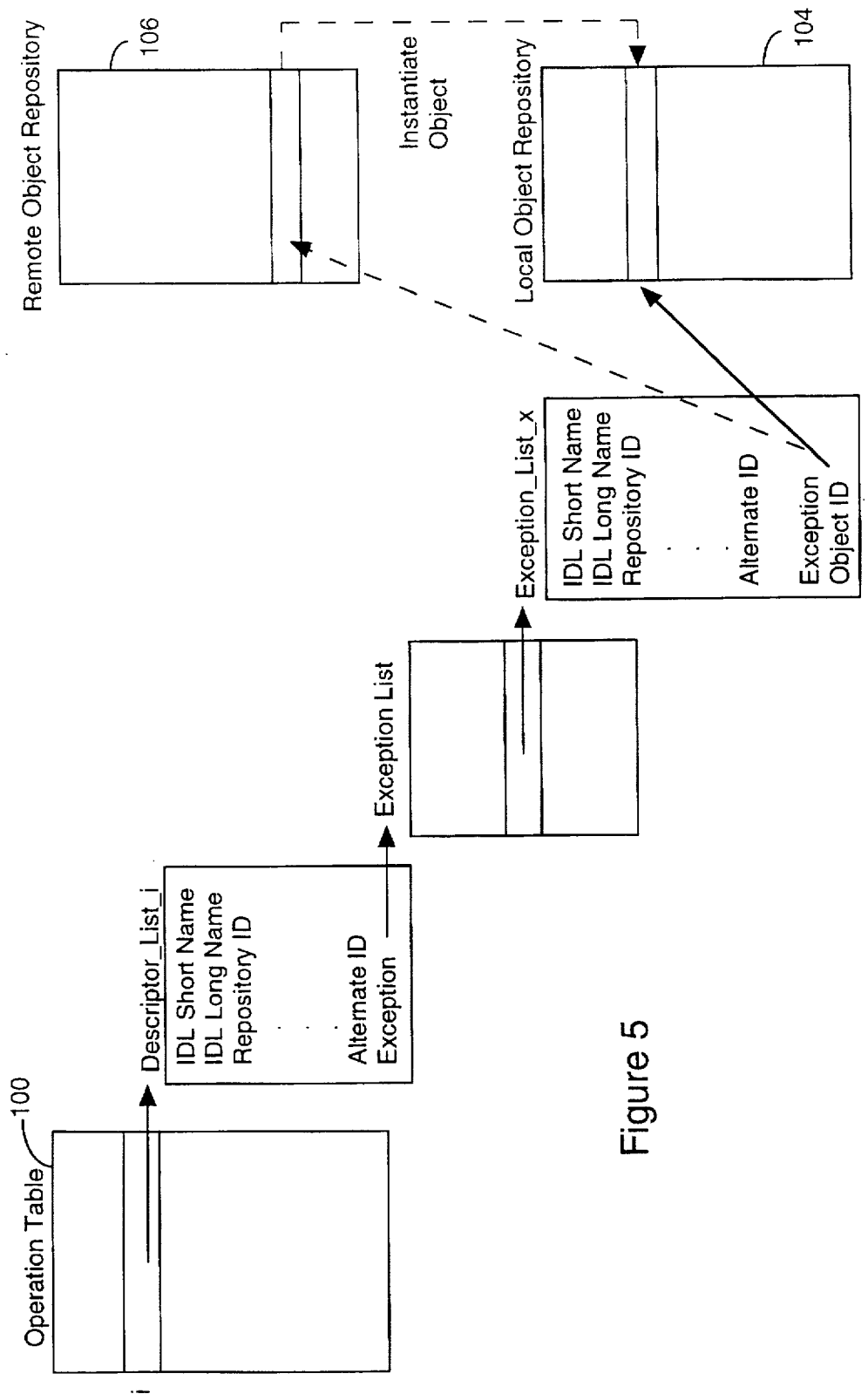
FIG. 5 is a generalized representation of a data structure that may be used in practicing the disclosed technology.

The invention has now been fully disclosed. FIG. 5 illustrates an additional aspect of the technology. Namely, FIG. 5 illustrates that the invention supports method calls and their associated exceptions. FIG. 5 illustrates the operation Table 100 of FIG. 4. As indicated above, the operation table is stored in the server stubs 56. The figure shows that the index value "i" of the operation table is linked to a particular subset (Descriptor_List_i) of the list. As indicated above, the Descriptor_List is available to the server subcontract 58. The subset list includes "j" entries, including an IDL short name, an IDL long name, a repository identification, an alternate identification, etc. As shown in FIG. 4, the server invokes operation i from the operation table 100 and returns a reply to the client. The reply may include an exception descriptor. For example, relying upon the "get_weak_comparatorOperationDescriptorInstance" example above, the exception descriptor may be the string "_get_weak_comparatorExceptionDescriptorInstance".

The client subcontract 40 has the operation descriptor which includes an exception list. The exception descriptor in the reply is used by the client side subcontract 40 to determine which exception was returned. This matching operation can be performed using the technique described above for matching the operation descriptor.

The exception descriptor points to an exception list that has N exception subset lists. FIG. 5 shows Exception_List_x. Each subset list specifies one of the exceptions to the method call and the IDL short name, IDL long name, a repository identification, and an alternate identification for the exception. Note that the "jth" entry of each subset list of the list of protocol-dependent values corresponds to a particular protocol, say the IDL short name protocol.

The exception descriptor concept is further illustrated in FIG. 4. Note that the last entry in the subset descriptor list "Descriptor_List_1" is an exception descriptor that points to an exception list. The reply generated by the server computer and passed to the client computer includes an indication of the exception, if necessary. The exception can be matched to an exception in the exception list.

The client subcontract 40 stores a copy of the exception list associated with an exception descriptor. Thus, when the exception descriptor is received from the server computer 24, the client computer 22 can process the exception descriptor. The exception descriptor is processed by calling exception code for each entry in the exception list. Note in FIG. 5 that Exception_List_x, like all other exception subset lists, includes an exception object identification, which points to an object in a local object repository 104. The exception object identification may be a string name that is linked to an object in the local object repository 104. Each object in the local object repository 104 provides coded instructions or information to allow the client computer 22 to handle the exception. In the event that the object does not reside in the local object repository 104, the operating system 42 instantiates the object into the local object repository 104 by downloading code from another computer on the network.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

In the claims:

1. A method for handling diverse protocol method calls in a client/server computer system, said method comprising the steps of:

receiving at a server computer a method call generated by a client computer;

locating within said method call a method descriptor specified in a protocol-dependent format;

retrieving an index value associated with said method descriptor;

passing said index value to a protocol-independent processing module of said server computer;

executing, in said server computer, a protocol independent method corresponding to said index value to generate a reply; and transferring said reply from said protocol-independent processing module to said client computer.

2. The method of claim 1 wherein said receiving step includes the step of passing said method call from an application program of said client computer, to a client stub program of said client computer, to a subcontract program of said client computer, to a transmission channel linking said client computer and said server computer, to a subcontract program of said server computer which stores said list of protocol-dependent values.

3. The method of claim 1 wherein said locating step includes the step of unmarshalling a marshal buffer containing said method call.

4. The method of claim 1 wherein said retrieving step includes the step of using a list of protocol-dependent values which includes statements selected from the group including an Interface Definition Language (IDL) short name, an IDL long name, and an IDL repository identification.

5. The method of claim 1 wherein said passing step includes the step of passing said index value to said protocol-independent processing module of said server computer, which is implemented as a server stub program operating on said server computer.

6. The method of claim 1 wherein said transferring step includes the step of transferring said reply from said server stub program operating on said server computer to a subcontract program operating on said server computer, to a transmission channel linking said server computer and said client computer, to a subcontract program operating on said client computer, to a client stub program operating on said client computer.

7. A client/server computer apparatus, comprising:

a transmission channel;

a client computer connected to said transmission channel, said client computer generating a method call that is applied to said transmission channel; and a server computer connected to said transmission channel to receive said method call, said server computer including:

a module to locate within said method call a method descriptor specified in a protocol-dependent format, a module to compare said method call to a list of protocol-dependent values stored in the memory of said server computer, a module to assign an index value upon matching said method descriptor to a selected protocol-dependent value in said list of protocol-dependent values, a module to pass said index value to a server-side stub program executing on said server computer, a module to execute protocol independent method information specified by said index value to generate a reply, and a module to transfer said reply from said server-side stub to said client computer.

8. The client/server computer apparatus of claim 7 wherein said list of protocol-dependent values stored in said memory of said server computer includes statements selected from the group including an Interface Definition Language (IDL) short name, and IDL long name, and an IDL repository identification.

9. The client/server computer apparatus of claim 7 wherein said reply includes an exception to said method call.

10. The client/server computer apparatus of claim 9 wherein said client computer matches said exception with a value in a list of exceptions.

11. A computer readable memory that can be used to direct a client/server computer system to function in a specified manner, comprising:

method call information stored in said memory, said method call information including:

(1) a list of protocol-dependent values, and (2) a set of protocol independent method execution instruction modules, at least one method execution instruction module specifying a set of operations to be performed in executing a requested method call; and executable instructions stored in said memory, said executable instructions including:

(3) instructions to locate within a method call, originating from a client computer of said client/server computer system, a method descriptor specified in a protocol-dependent format, (4) instructions to assign an index value upon matching said method descriptor to a selected protocol-dependent value in said list of protocol-dependent values, (5) instructions to pass said index value to a server-side stub executing on a server computer of said client/server computer architecture, (6) instructions to execute on said server computer, based upon said index value, a selected method execution instruction module of said set of protocol independent method execution instruction modules to generate a reply, and (7) instructions to transfer said reply to said client computer.

12. The computer readable memory of claim 11 wherein said list of protocol-dependent values stored in said memory includes statements selected from the group including an Interface Definition Language (IDL) short name, and IDL long name, and an IDL repository identification.

13. The computer readable memory of claim 11 wherein said reply includes an exception to said method call.

14. A method executed by a client/server computer system operating under the control of a program, said client/server computer system including a client computer memory and a server computer memory for storing said program, said method comprising the steps of:

(1) storing in said server computer memory a list of protocol-dependent values;

(2) storing in said server computer memory a set of protocol independent method execution instruction modules, each method execution instruction module specifying a set of operations to be performed in executing a requested method call;

(3) locating within a method call, originating from a client computer of said client/server computer system, a method descriptor specified in a protocol-dependent format;

(4) assigning an index value upon matching said method descriptor to a selected protocol-dependent value in said list of protocol-dependent values;

(5) passing said index value to a server-side stub operating on a server of said client/server computer system;

(6) executing, based upon said index value, a selected method execution instruction module of said set of protocol independent method execution instruction modules to generate a reply; and (7) transferring said reply to said client computer.

15. The method of claim 14 wherein said locating step includes the step of unmarshalling a marshal buffer containing said method call.

16. The method of claim 14 wherein said assigning step includes the step of using a list of protocol-dependent values which includes statements selected from the group including an Interface Definition Language (IDL) short name, an IDL Long name, and an IDL repository identification.

17. The method of claim 14 wherein said executing step includes the step of generating a reply with an exception descriptor.

* * * * *